United States Patent [19]
Lee

[11] Patent Number: 5,917,801
[45] Date of Patent: Jun. 29, 1999

[54] OPTICAL PICKUP DEVICE

[75] Inventor: Man Hyung Lee, Seoul, Rep. of Korea

[73] Assignee: LG Electronics, Inc., Seoul, Rep. of Korea

[21] Appl. No.: 09/030,214

[22] Filed: Feb. 25, 1998

[30] Foreign Application Priority Data

Feb. 25, 1997 [KR] Rep. of Korea .......................... 97-5805

[51] Int. Cl.$^6$ ....................................................... G11B 7/00
[52] U.S. Cl. ........................ 369/112; 369/44.23; 369/116
[58] Field of Search .............................. 369/44.12, 44.23, 369/44.24, 112, 116

[56] References Cited

U.S. PATENT DOCUMENTS 5,701,287  12/1997  Hineno et al. ........................... 369/112

*Primary Examiner*—Tod R. Swann
*Assistant Examiner*—Kim-Kwok Chu

[57] ABSTRACT

An optical pickup device which is mechanically simple and economical to shape waveforms of a laser beam, includes a light source for emitting the laser beam having a Gaussian light distribution, a beam splitter having an optical thin film coating surface which transmits the laser beam emitted from the light source at a constant light distribution, for shaping waveforms of the laser beam, a collimation lens for outputting a round shaped beam having a constant light distribution, from the transmitted laser beam of the beam splitter, and an object lens for focusing the round shaped beam from the collimation lens on an optical disk. The optical pickup device uniformly maintains light distribution of incident light which passed through the beam splitter using the optical thin film coating characteristic.

3 Claims, 6 Drawing Sheets

OPTICAL PICKUP DEVICE

BACKGROUND OF THE INVENTION

1. Field of the Invention

The present invention relates to an optical pickup device, and more particularly, to an optical pickup device which uniformly shapes waveforms of a laser beam.

2. Discussion of the Related Art

A conventional optical pickup device for shaping waveforms will be described with reference to the accompanying drawings.

FIG. 1 is a schematic view illustrating an optical pickup device for shaping waveforms using a cylinder lens, according to the first embodiment of the prior art.

The conventional optical pickup device includes a laser diode 21, a collimation lens 22, a cylinder lens 23, a beam splitter 24, a reflecting mirror 25, an object lens 26, and a disk 27. The laser diode 21 emits an elliptical laser beam. The collimation lens 22 collimates the emitted laser beam to be incident on the cylinder lens 23.

The laser beam emitted from the laser diode 21 will be described with reference to FIGS. 2a and 2b.

FIG. 2a is a graph illustrating the distribution of laser beam emitted from a general laser diode. FIG. 2b is a graph illustrating a beam shape of equivalent distributed section of FIG. 2a.

As shown in FIGS. 2a and 2b, in general, the laser beam emitted from the laser diode 21 has an elliptical shape when it is taken along equivalent distributed section due to difference of emitting angle against horizontal (x) and vertical (y) direction.

In the conventional optical pickup device, the focus size of the laser beam formed on the disk 27 depends on distribution of intensity of incident light. If angle difference of the emitted laser beam is large, the focus size of the laser beam of which emitting angle is large becomes smaller while the focus size of the laser beam of which emitting angle is small becomes larger. As a result, unbalance of the beam size occurs in pit and track directions on the disk 27.

Therefore, it is necessary to shape waveforms so as to uniformly distribute the intensity of incident light in each direction.

The laser beam emitted to the cylinder lens 23 passes without being reflected in vertical direction and is widened as being reflected in horizontal direction.

In other words, waveforms of the elliptical laser beam emitted from the laser diode 21 can be shaped through the cylinder lens 23, which is a concave lens, to uniformly maintain a radiation angle in vertical direction and a radiation angle in horizontal direction.

The laser beam of which waveforms are shaped by the cylinder lens 23 is incident on the collimation lens 22. Then, the path of the laser beam is changed to parallel direction to have the laser beam be incident on the beam splitter 24. The laser beam is then reflected by the reflecting mirror 25 and focused on the disk 27 by means of the object lens 26.

FIGS. 3a and 3b are schematic views illustrating an optical pickup device for shaping waveforms using a prism and two prisms, respectively, according to the second embodiment of the prior art.

In this embodiment of the prior art, a prism 31 or two prisms instead of the cylinder lens 23 of FIG. 1 can be used to shape waveforms of the elliptical laser beam emitted from the laser diode 21 uniformly in horizontal and vertical directions.

The aforementioned optical pickup device according to the prior art has several problems.

Since the cylinder lens and one prism or two prisms are used to shape waveforms of the laser beam, the device becomes complicated mechanically, which is thus not economical.

SUMMARY OF THE INVENTION

Accordingly, the present invention is directed to an optical pickup device that substantially obviates one or more of the problems due to limitations and disadvantages of the related art.

An object of the present invention is to provide an optical pickup device which is mechanically simple and economical to shape waveforms of laser beam.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an optical pickup device according to the present invention includes a light source for emitting a laser beam having a Gaussian light distribution, a beam splitter having an optical thin film coating surface which transmits the laser beam emitted from the light source at a constant light distribution, for shaping waveforms of the laser beam, a collimation lens for outputting a round shaped beam having a constant light distribution, from the transmitted laser beam of the beam splitter, and an object lens for focusing the round shaped beam from the collimation lens on an optical disk.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 2b is a graph illustrating a beam shape of equivalent distributed section of FIG. 2a;

DETAILED DESCRIPTION OF THE PREFERRED EMBODIMENTS

Reference will now be made in detail to the preferred embodiments of the present invention, examples of which are illustrated in the accompanying drawings.

Figure 1:
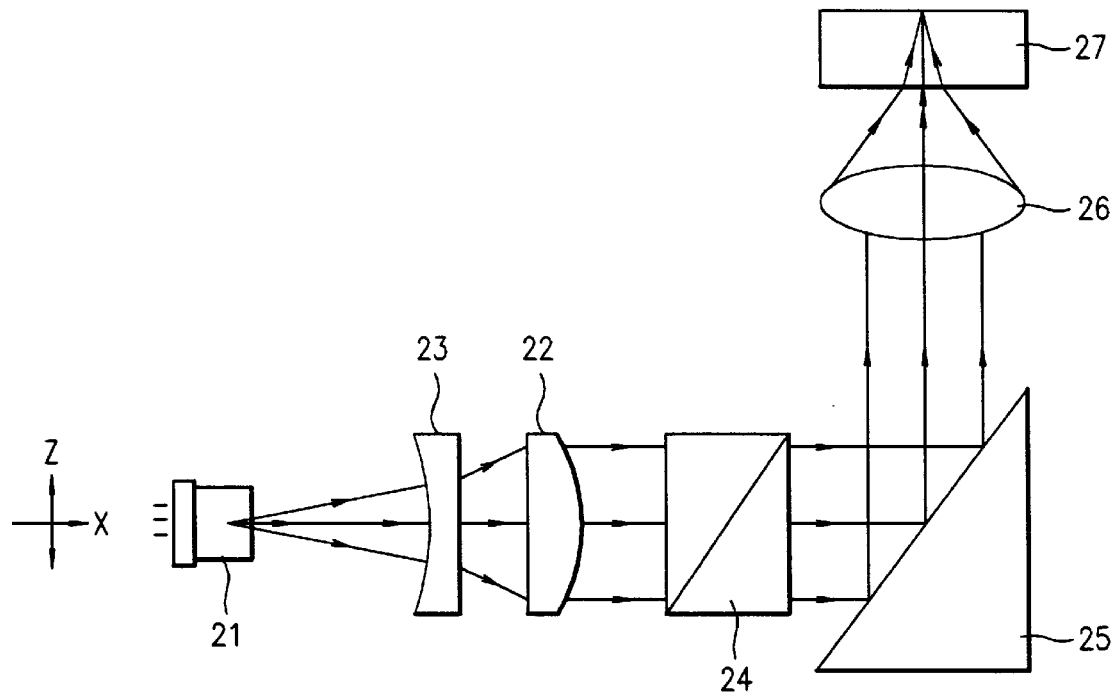
FIG. 1 is a schematic view illustrating an optical pickup device for shaping waveforms using a cylinder lens, according to the first embodiment of the prior art.
Figure 2A:
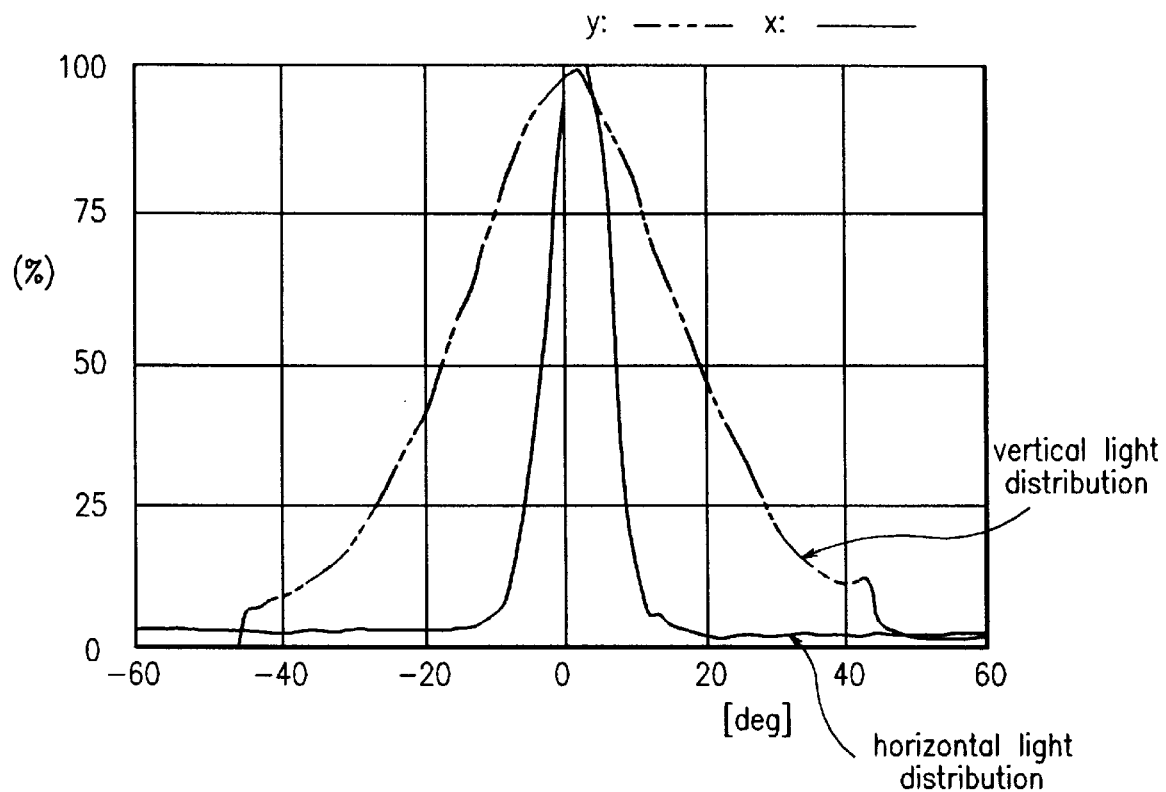
FIG. 2a is a graph illustrating the distribution of laser beam emitted from a general laser diode.
Figure 2B:
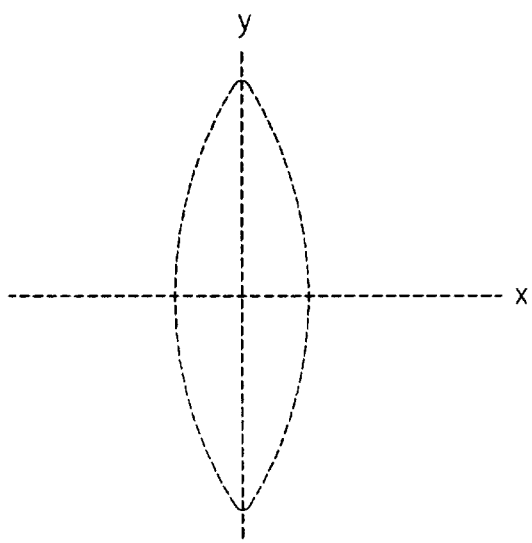
Figure 3A:
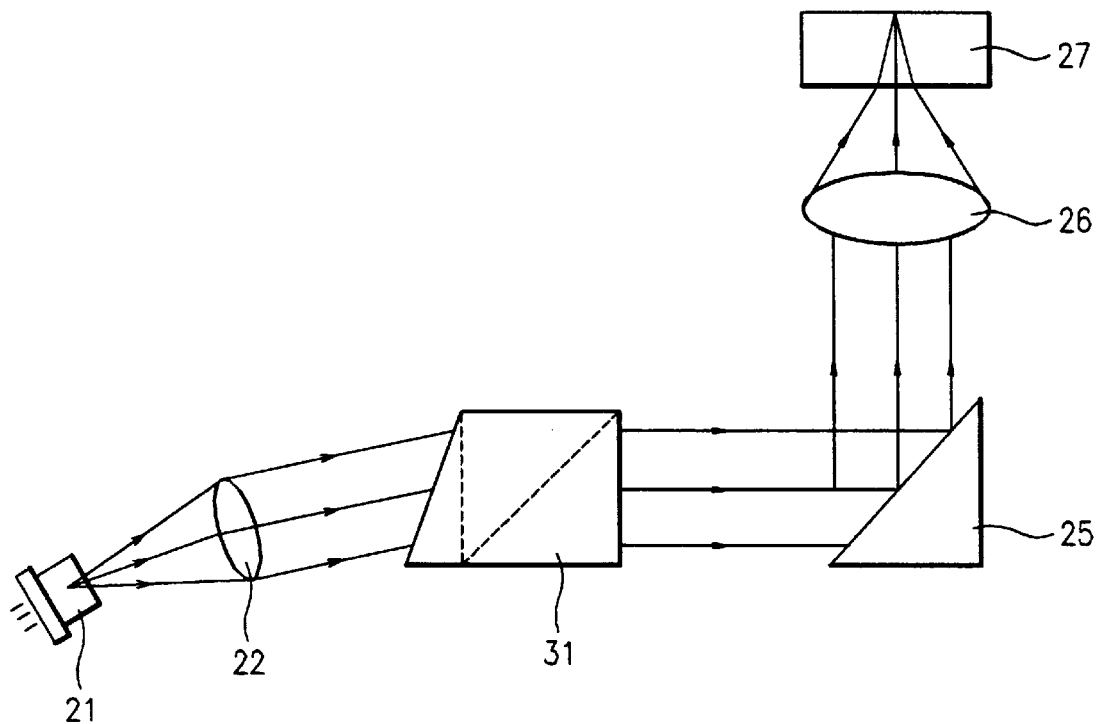
FIGS. 3a and 3b are schematic views illustrating an optical pickup device for shaping waveforms using a prism and two prisms, respectively, according to the second embodiment of the prior art.
Figure 3B:
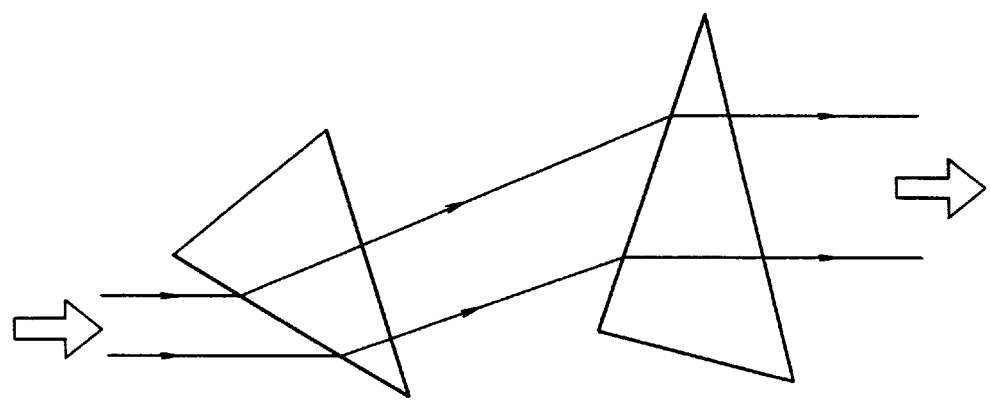
Figure 4:
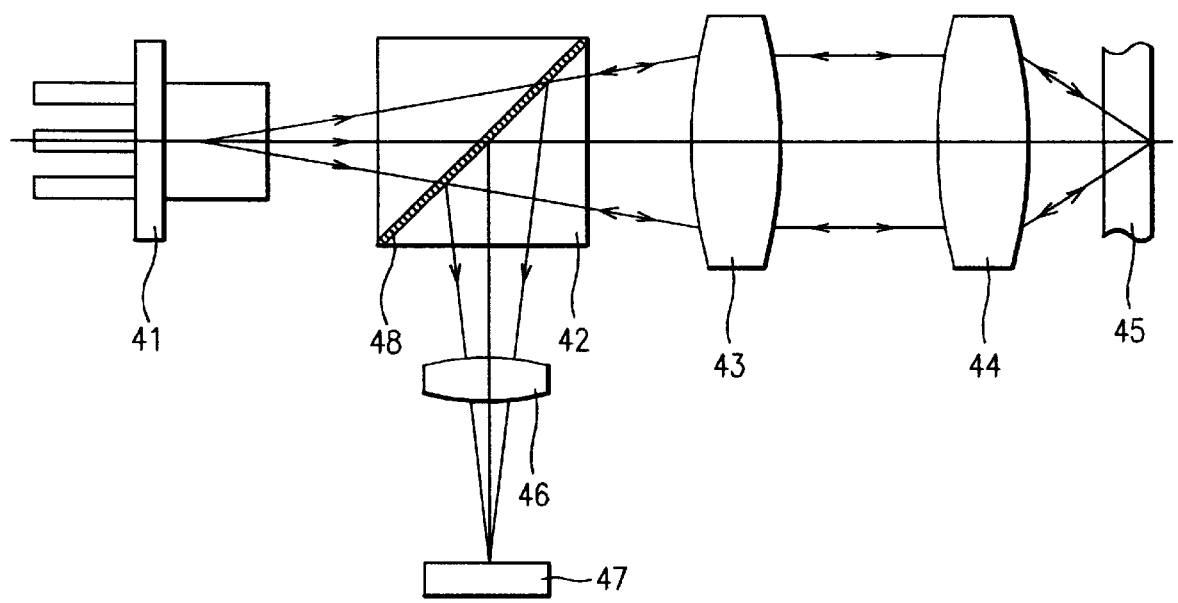
FIG. 4 is a schematic view illustrating an optical pickup device for shaping waveforms by controlling transmittivity by an optical thin film coating, according to the present invention.

As shown in FIG. 4, an optical pickup device of the present invention includes a laser diode 41, a beam splitter 42, a collimation lens 43, an object lens 44, a sensor lens 46, and a light receiving element 47.

The laser diode 41 emits a laser beam. The beam splitter 42, which is coated with an optical thin film 48 on a predetermined surface, transmits the laser beam emitted from the laser diode 41 at constant light distribution and reflects the transmitted laser beam. The collimation lens 43 advances the laser beam transmitted from the beam splitter 42 in parallel and outputs a laser beam of which waveforms are shaped. The object lens 44 focuses the laser beam output from the collimation lens 43 on a signal track of an optical disk 45. The sensor lens 46 restores the laser beam reflected on the disk 45 through incident paths of the object lens 44 and the collimation lens 43, and focuses the laser beam reflected on the beam splitter 42. The light receiving element 47 senses the laser beam focused by the sensor lens 46.

The beam splitter 42 may be formed of a cube type or a plate type. If the beam splitter 42 is a cube of which two prisms are contacted with each other, a contact surface between the two prisms is coated with the optical thin film. If the beam splitter 42 is a plate, one surface or both surfaces are coated with the optical thin film.

The optical thin film formed between the two prisms made of glass includes twenty-one layers having thicknesses of 0.317M, 0.473H, 0.349M, 0.316L, 0.466M, 0.375H, 0.358M, 0.288L, 0.502M, 0.329H, 0.509M, 0.25L, 2(0.5M, 0.25H, 0.5M, 0.25L), and 0.5M.

H means a high refractive index of $TiO_2$, M means an intermediate refractive index of $Al_2O_3$, and L means a low refractive index of $SiO_2$. A refractive index of the prism is 1.515, a refractive index of H is 2.3, a refractive index of M is 1.63, and a refractive index of L is 1.38. A reference wavelength $\lambda_0$ is 645 nm, that is, $\lambda_0$=645 nm, and a reference wavelength $\lambda_m$ of a monitor is 556 nm, that is, $\lambda_m$=556 nm. 2(0.5M, 0.25H, 0.5M, 0.25L) means that 0.5M, 0.25H, 0.5M, 0.25L are twice repeated.

Figure 5:
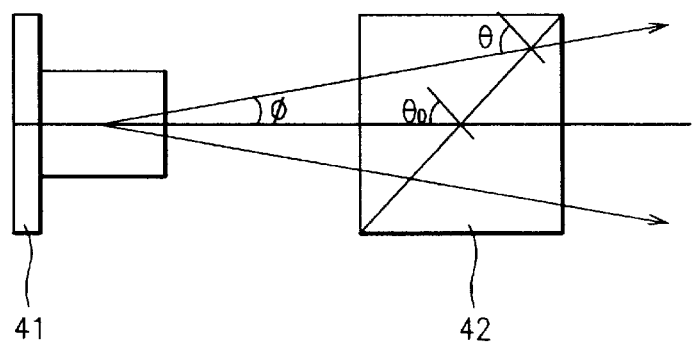
FIG. 5 is a detailed view illustrating a beam splitter of FIG. 4.

FIG. 5 is a detailed view illustrating transmission characteristic of the beam splitter 42 of FIG. 4.

The beam splitter 42 has symmetrical transmission characteristic against a reference angle $\theta_0$. If any angle $\theta$ is defined as $\Delta\theta=\theta-\theta_0$, transmission characteristic for S polarized light and P polarized light can be expressed as the following equation (1).

$$T(\Delta\theta) = T_0 e^{2\left(\Delta\frac{\theta}{\theta_e}\right)^2}$$

In the equation (1), $T_0$ is transmittivity per polarized light in the reference angle $\theta_0$. $\theta_e$ is a radiation angle at a position where the distribution of light intensity in uniform direction becomes smaller as less as $1/e^2$ against peak.

Figure 6:
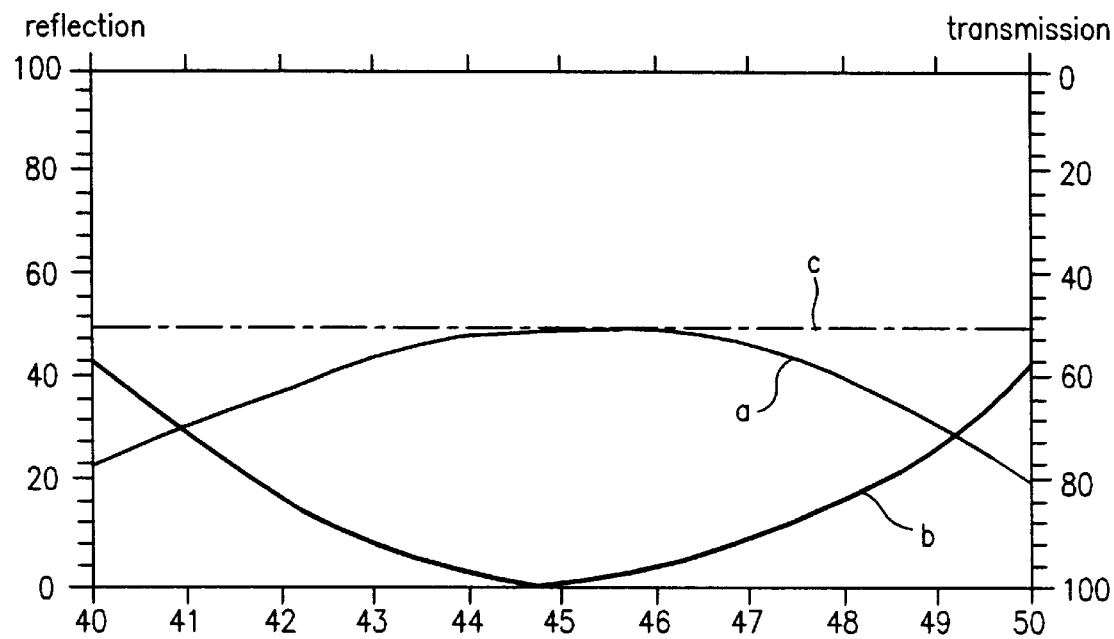
FIG. 6 is a graph illustrating the distribution of laser beam of which P polarized light passed through the beam splitter of FIG. 4.

FIG. 6 is a graph illustrating the distribution of laser beam of which P polarized light passed through the beam splitter of FIG. 4. For example, when the laser beam emitted from the laser diode 41 is incident on the optical thin film in P polarized light, the distribution of the laser beam based on Gaussian distribution and emitted from the laser diode 41 can be expressed as the following equation (2).

$$I(\Phi) = e^{-2\left(\frac{\Phi}{\theta_e}\right)^2}$$

In the equation (2), $\Phi$ is an emitting angle of the laser diode.

The laser beam emitted from the laser diode 41 having the Gaussian distribution of the equation (2) is shown as "b" of FIG. 6. However, the laser beam is uniformly distributed as shown in "c" of FIG. 6 due to distribution characteristic of P polarized light against an angle of the optical thin film 48 of the beam splitter 42 as shown in "a" of FIG. 6.

In other words, since the laser beam emitted from the laser diode 41 having light distribution of the equation (2) is transmitted to the coating surface of the beam splitter 42 having transmission characteristic of the equation (1), the distribution of the laser beam which passed through the beam splitter 42 becomes constant at $T_0$ regardless of the emitting angle $\Phi$ of the laser diode 41.

At this time, the relation between deviation ratio $\Delta\theta$ of the incident angle on the coating surface of the beam splitter 42 and the emitting angle $\Phi$ of the laser diode 41 can be expressed as the following equation (3).

$$\Delta\theta = \operatorname{Sin}^{-1}\left(\frac{\operatorname{Sin}\Phi}{N}\right)$$

In the equation (3), $\Phi$ is the emitting angle of the laser diode 41 and N is a refractive index of the prism.

Figure 7:
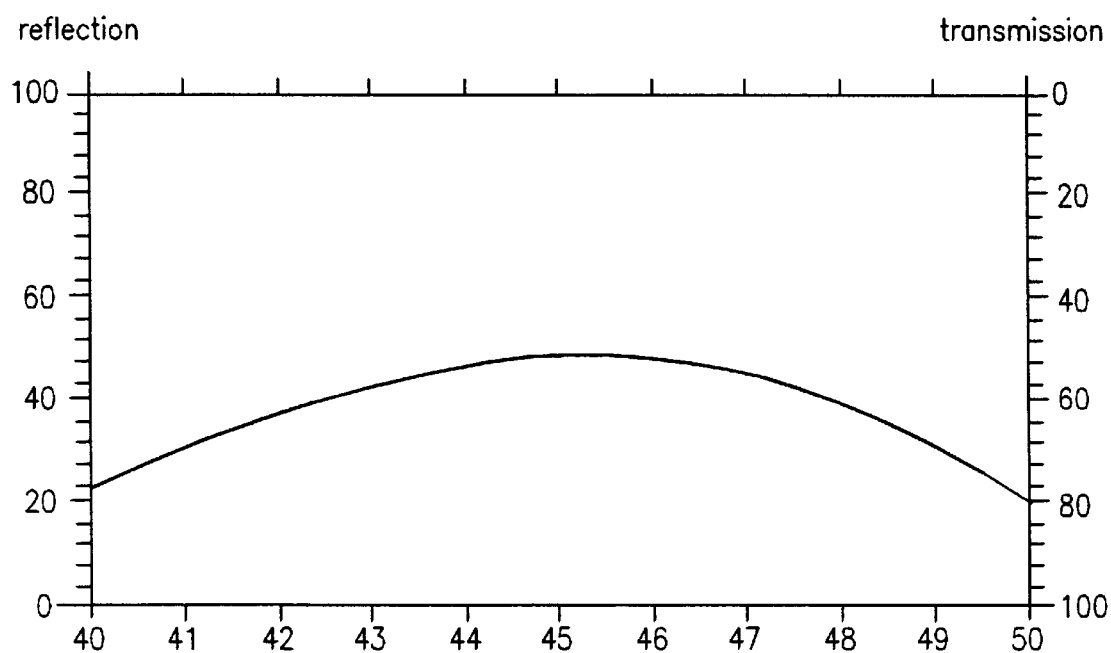
FIG. 7 is a graph illustrating the distribution characteristic of P polarized light for an optical thin film of the beam splitter of FIG. 4.
Figure 8:
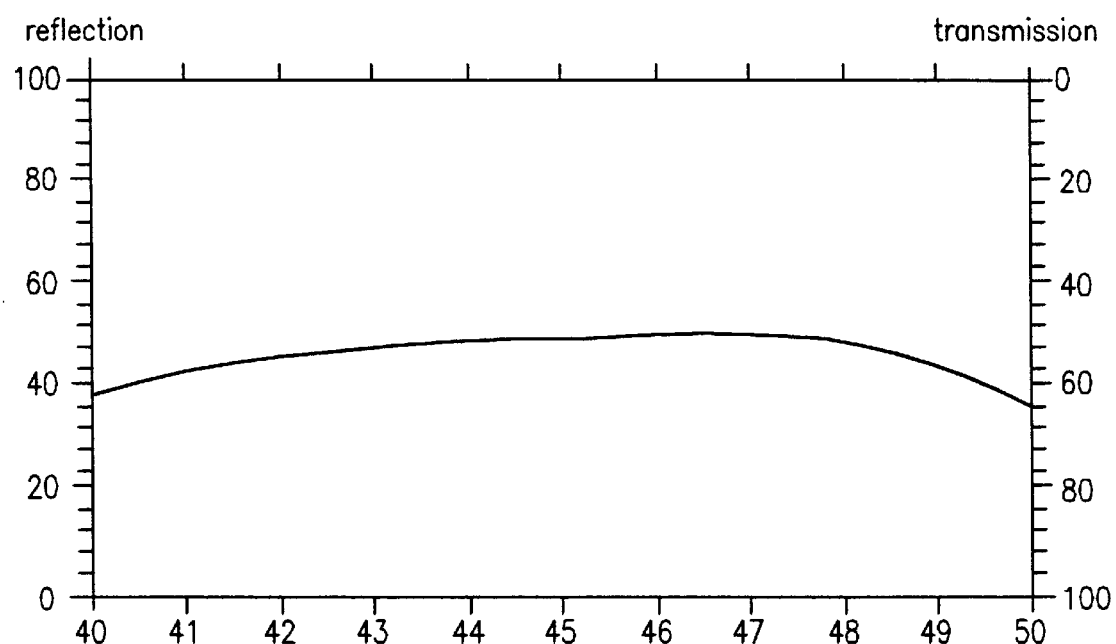
FIG. 8 is a graph illustrating the distribution characteristic of S polarized light for an optical thin film of the beam splitter of FIG. 4.

FIG. 7 is a graph illustrating the distribution characteristics of P polarized light for an optical thin film of the beam splitter of FIG. 4. FIG. 8 is a graph illustrating the distribution characteristic of S polarized light for an optical thin film of the beam splitter of FIG. 4.

Referring to FIGS. 7 and 8, the distribution characteristic of P polarized light and S polarized light is shown for the optical thin film 48 of the beam splitter 42 having transmission characteristic as the above equation (1).

As aforementioned, if the beam splitter 42 is coated with the optical thin film 48 having characteristic such as the equation (1) even if the laser diode 41 emits the elliptical laser beam, the constant light distribution can be maintained.

When the laser beam having the constant light distribution passes through the collimation lens 43, a shape of the laser beam is changed from the elliptical shape to a round shape.

The laser beam of which light distribution is constant is focused on the disk 45 through the object lens 44. As a result, a beam spot is formed, of which light distribution of incident light is almost close to parallel light. Therefore, the size of the beam spot in a portion having the intensity of light of $1/e^2$ can be expressed as the following equation (4).

$$W_{1/e^2} = 0.82\left(\frac{\lambda}{NA}\right)$$

The size of the beam spot defined as the equation (4) is much less than the size of the beam spot defined by the incident light having the Gaussian distribution, that is, $$W_{1/e^2} = K\frac{\lambda}{2NA}$$

wherein, K is a diameter of the Gaussian beam corresponding to $1/e^2$/the size of an incident mirror.

In case of the smaller beam spot, modulation of a signal read out from the disk 45 becomes larger, thereby improving playback characteristic of the disk 45.

As aforementioned, the beam spot of which waveforms are shaped is reflected and diffracted by a pit recorded on the disk 45 and then focused by the object lens 44. The beam spot is reflected again by the beam splitter 42 through the collimation lens 43.

The laser beam reflected by the beam splitter 42 is focused by the sensor lens 60 and converted to an electrical signal by means of the light receiving element 47 to reproduce a signal.

The aforementioned optical pickup device according to the present invention has the following advantages.

The conventional cylinder lens or prism which is used to shape waveforms of the laser beam is removed from the optical pickup device. Since waveforms of the laser beam can uniformly be shaped by only the beam splitter having the optical thin film, it is possible to realize the device which is economical and simple.

It will be apparent to those skilled in the art that various modifications and variations can be made in the optical pickup device according to the present invention without departing from the spirit or scope of the invention. Thus, it is intended that the present invention covers the modifications and variations of the invention provided they come within the scope of the appended claims and their equivalents.

What is claimed is:

1. An optical pickup device comprising:

a light source for emitting a laser beam having a Gaussian light distribution;

a beam splitter having an optical thin film coating surface which transmits the laser beam emitted from the light source at a constant light distribution, for shaping waveforms of the laser beam;

a collimation lens for outputting a round shaped beam having a constant light distribution, from the transmitted laser beam of the beam splitter; and an object lens for focusing the round shaped beam from the collimation lens on an optical disk.

2. The optical pickup device as claimed in claim 1, wherein the beam splitter includes the optical thin film coating surface on a contact portion between two prisms if the beam splitter is a cube.

3. The optical pickup device as claimed in claim 1, wherein the beam splitter includes the optical thin film coating surface on one surface or both surfaces of a plate if the beam splitter is the plate.

* * * * *